Feb. 3, 1970 R. L. MILLER 3,493,865
FREQUENCY ENCODED DIGITAL TRANSMISSION WITH EACH ENCODED
FREQUENCY CONTINUOUSLY SWEPT OVER A BAND OF FREQUENCIES
Filed March 17, 1966 2 Sheets-Sheet 1

INVENTOR
R. L. MILLER
ATTORNEY

United States Patent Office 3,493,865

Patented Feb. 3, 1970

3,493,865

FREQUENCY ENCODED DIGITAL TRANSMISSION WITH EACH ENCODED FREQUENCY CONTINUOUSLY SWEPT OVER A BAND OF FREQUENCIES

Ralph L. Miller, Chatham, N.J., assignor to Bell Telephone Laboratories, Incorporated, New York, N.Y., a corporation of New York Filed Mar. 17, 1966, Ser. No. 535,208
Int. Cl. H04b *1/00, 7/00*
U.S. Cl. 325—30 2 Claims

ABSTRACT OF THE DISCLOSURE

A system is described which improves the reliability of communication over a multipath channel by sweep-modulating the input signals to the channel. The plural delayed output signals from the channel are then correspondingly detected. A sweep oscillator and heterodyne detector are used to produce a plurality of signals at spaced-apart frequencies which are combined to produce a composite signal. This signal is shown to have increased power compared to the detection product derived from a single received replica of the input signals. These techniques are shown to also be effective for purposes of establishing and maintaining synchronization and for characterizing the channel.

Figure 2:
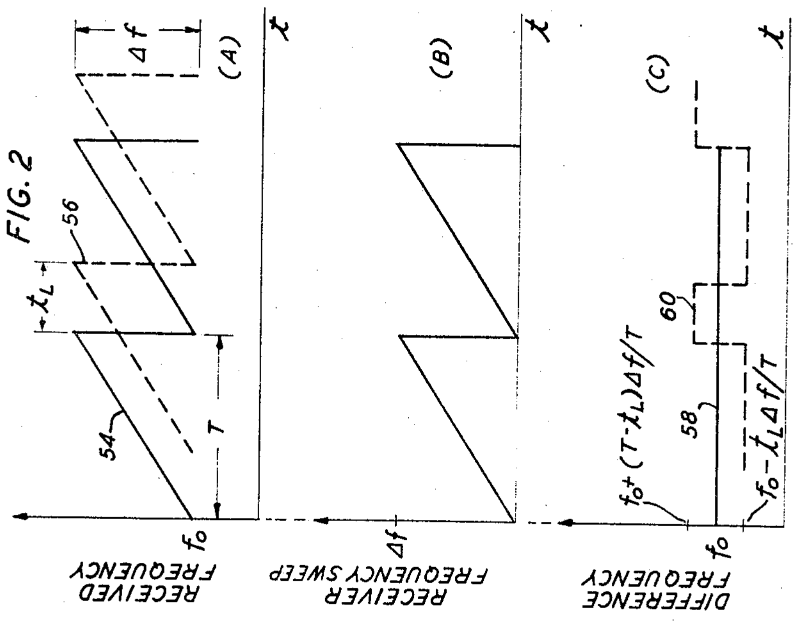

This invention relates to signal transmitting and receiving systems for communicating information. More specifically, this invention is concerned with improvements in such systems to counteract the effects of slow selective fading and other transmission impairments.

One of the most serious limitations on the use of communication systems employing electromagnetic or acoustic wave propagation in nonconfined media has been their susceptibility to fading. Such fading, or unusually high attenuation, is commonly encountered in radio links using signals in any one of several frequency ranges and in acoustic signaling systems for use through water or large stratified solid media such as portions of the earth. This fading is largely attributable to the many and diverse paths followed by transmitted signals while traveling to the receiver location. This phenomenon is usually referred to as the multipath problem.

Because of their wave properties, signals which travel over two paths of equal attenuation, but which differ in length by an amount equal to one-half the transmitted wavelength, will cancel each other, thereby resulting in a decrease in received power. This type of cancellation will also occur for signals traveling over paths differing in length by three-halves of a wavelength or any other odd number of half wavelengths. Partial cancellation will occur when the signals received by way of two paths are unequal in magnitude or not of antipodal phase.

A medium giving rise to a multiplicity of transmission paths is often relatively stable; at worst, large scale changes occur slowly with time, although small changes may occur more rapidly. This being so, communication between fixed points is accomplished by ttransmission paths which are fairly constant with time. A result of this relative constancy is that multipath fading occurs at frequencies that change only slowly with time. It must be borne in mind, however, that under these conditions of so-called slow fading minor path changes can cause fading to occur at slightly different frequencies in a short time interval.

The free space wave train for a typical multipath channel, such as that encountered when communicating by high frequency radio via the ionosphere, ordinarily contains many complete cycles at the transmitted frequency. Accordingly, a slight change in transmitted frequency, corresponding to a small change in the length of each cycle of the free space wave train, may result in a marked change in the phase discrepancy between signals received by way of two transmission paths. Specifically, signals at one frequency may arrive at a receiver by two paths so as to add in-phase while those differing in wavelength by a very small percentage may experience complete cancellation. Such fading is therefore said to be frequency selective.

The mechanism for propagating information over a multipath channel is usually much more complex than the two-path discussion presented above. To be sure, some fading is not at all slow. In addition, whole bands of frequencies may experience simultaneous obliteration. Nevertheless, slow selective fading is found to be typical of many communications situations including those mentioned above.

Despite its ubiquity and its commercial and strategic consequences, the multipath problem has not been found amenable to economical solution. Merely increasing transmitter power in a brute-force manner is quite ineffective in combating deep fades. Frequency diversity techniques have been able to ensure satisfactory performance only by employing a sufficiently large number of transmitters. Space diversity solutions require a plurality of receiving antennas or other transducers, and usually, an equal number of receivers. In addition, the latter two techniques often require complicated combining networks.

Accordingly, it is an object of the present invention to provide an improved communication system capable of communicating with increased reliability in the presence of slow selective fading.

It is another object to increase the minimum average power of received signals without an attendant increase of transmitted power when communicating over a multipath channel.

It is another object to provide a simplified economical means for spreading power of a transmitted signal continuously over a range of frequencies to reduce its susceptibility to fading.

It is another object to provide an improved communication system exhibiting superior rejection of extraneous signals.

It is another object to provide simplified modulation and complementary demodulation means to permit a signal having improved frequency characteristics to be propagated over a multipath channel.

It is another object to provide an improved means for establishing and maintaining synchronism between transmitting and receiving terminals in a digital communication system.

It is still another object of the present invention to provide an improved measure of characteristics for a stochastically turbulent communication channel linking two points.

These and further objects of this invention will become more apparent when viewed in the light of the accompanying figures and the following discussion of particular embodiments.

Briefly stated, the present invention provides a method for increasing the reliability of multipath communication systems by spreading information signals continuously over a band of frequencies prior to transmission. This spreading ensures that not all of the transmitted power will be at frequencies subject to selective fading. The extent of the spread is dictated by the span between successive frequencies subject to severe fading. An operation is then performed at the receiver to counteract the effect of the frequency spreading and thereby restore the information signals. Since the signals received at frequencies between successive fading frequencies are necessarily possessed of relatively greater power, the net effect is to substantially increase the average power of a received signal relative to that of a signal received at a fading frequency. Viewed alternately, the present invention is seen as one for modifying transmitted signals in such manner as to permit complementary modification of received signals to result in constructive combination rather than possible cancellation.

The present invention also seeks to mitigate the effects of other transmission impairments, including those due to extraneous narrow band signals. Here, once again, the frequency spreading technique is used to advantage.

Figure 1A:
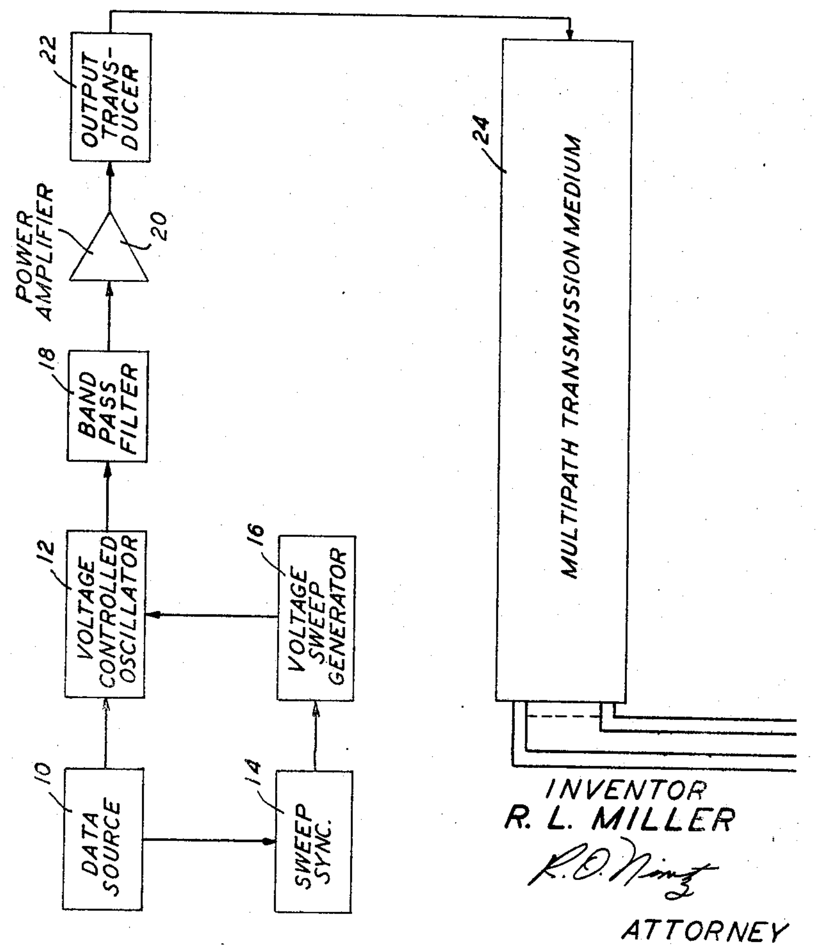
Figure 1B:
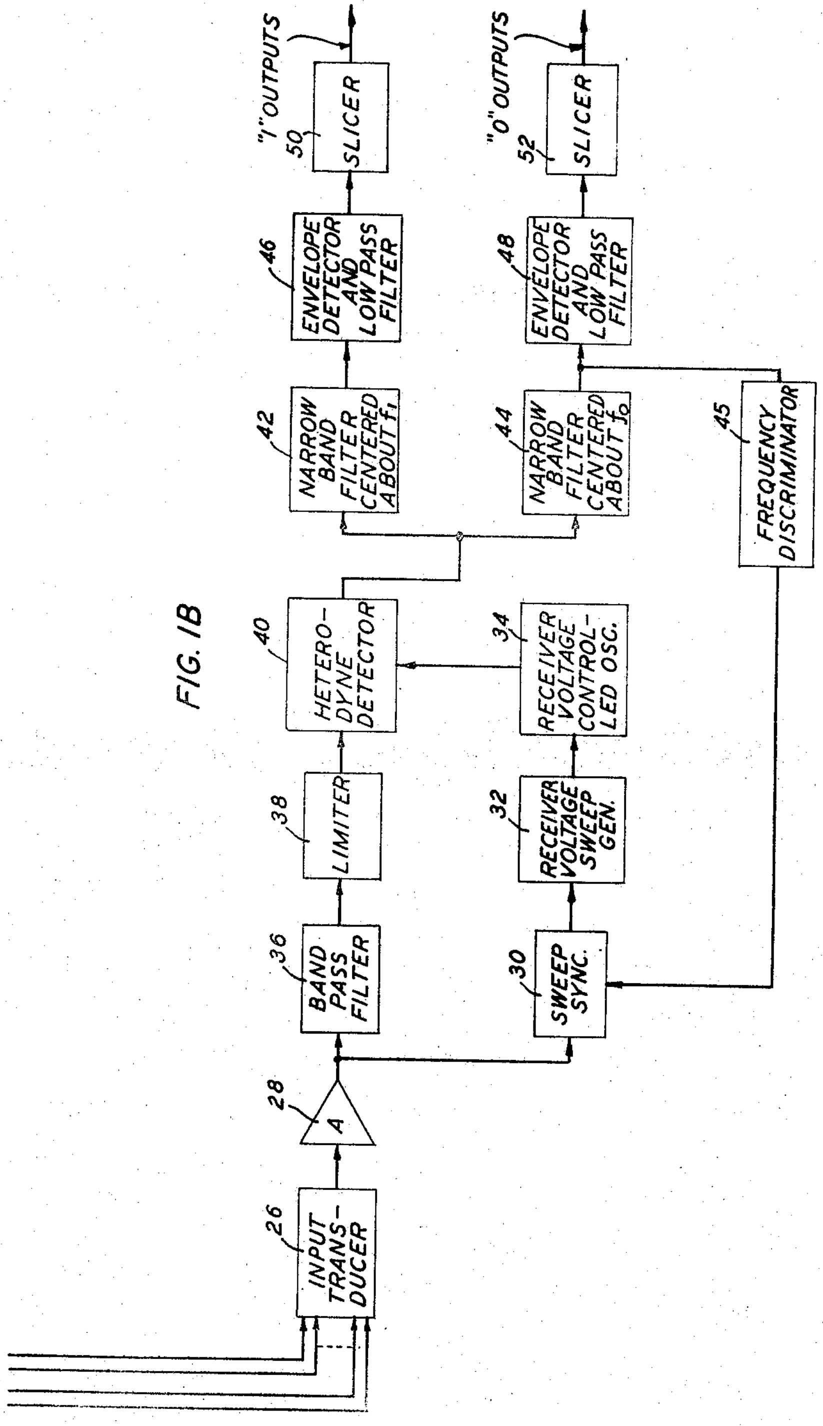

To facilitate the explanation of the present invention reference will be made to the accompanying drawings in which:

FIGS. 1A and 1B together constitute a block diagram representation of a typical embodiment of the invention.

FIG. 2 illustrates typical waveforms encountered in normal operation.

The essential elements of one embodiment of the present invention are illustrated in block diagram form in FIGS. 1A and 1B. FIG. 1A shows the elements that make up the transmitter portion of a communication system. Here, a serial digital information source 10 is used to provide one input signal to a voltage-controlled oscillator 12 in the form of a finite number of discrete voltage levels. For purposes of this discussion only, it will be assumed that there are two levels, i.e., the communication system is a binary one. An indication of the beginning of each data element is also supplied by the data source. The sweep sync circuit 14 uses this indication to generate a pulse at the outset of each element. The sweep sync pulses trigger a voltage sweep generator 16 having an output waveform that increases linearly with time and has period equal to that of a signalling element.

Both the data stream and the voltage sweep are applied to the voltage-controlled oscillator 12 which, in the absence of input signals, may have either a constant carrier frequency output or, as assumed here, no output. The effect of the double input is to produce at the output of the oscillator a signal whose frequency depends on both the information stream and a voltage sweep of known waveform. Thus, in a binary system having information signals represented by "1" and "0", a "1" might be represented at the output of the oscillator by an instantaneous frequency given by $f_1+t\Delta/T$, where $f_1$ is a constant frequency, $t$ is time measured from the beginning of an information character and having a maximum value of T, $\Delta f$ is the magnitude of the frequency excursion induced by the sweep voltage, and T is the duration of a signalling element. Likewise, a "0" might be represented by $$f_0+t\Delta f/T$$

where $f_0$ is a constant frequency different from $f_1$.

The frequencies $f_1$ and $f_0$ are analogous to those that might be used in a frequency-shift-keying system for transmitting "1's" and "0's", respectively. Here, these are the frequencies that would be transmitted if no sweep voltage were applied to the oscillator. Thus, the present invention may be considered to be an improvement in frequency-shift-keyed communications. The output from the voltage controlled oscillator is then filtered by a bandpass filter 18 to remove frequency components that fall outside of the intended range. This filtered signal is then amplified by a power amplifier 20 and delivered to the transmission medium by way of an appropriate output transducer 22.

The multipath nature of the transmission channel is represented by the block 24 having a single input and a multiplicity of outputs. It should be understood that each output of the channel may differ in time delay from all other outputs.

A typical receiver configuration according to this invention is shown in FIG. 1B. An input transducer 26 for matching the channel to the receiver circuitry is followed by an amplifier 28 to increase the level of received signals to a workable voltage. The sweep sync circuit 30 derives time base information from the amplifier output and causes the receiver voltage sweep generator 32 to generate a sweep signal. This sweep signal is such as to cause the voltage-controlled oscillator 34 to generate a constant amplitude frequency-sweep signal whose instantaneous frequency varies linearly from zero to $\Delta f$ during the time that a signalling element is being received. That is, the output of the voltage-controlled oscillator is given by $t\Delta f/T$; $t$ is now time measured from the beginning of a received signalling element and has a maximum value of T, $\Delta f$ is the same magnitude of frequency sweep employed at the transmitter, and T is once again the duration of a signalling element.

The output of amplifier 28 is also passed through a bandpass filter 36 to remove extraneous frequency components and then through a limiter 38 to provide uniform amplitude. The limited signal and the frequency-sweep signal are then applied to a heterodyne detector 40. The resulting output from the detector includes frequency components corresponding to the instantaneous difference in frequency between each delayed received signal and the receiver frequency-sweep signal. Since all of these signals are linearly increasing in frequency at the same rate, these difference frequencies should, for the most part, be constant.

In particular, a signal received over a given path and having the characteristic that it starts and completes its linear sweep in time synchronism with the receiver frequency-sweep signal, should give rise to a constant difference frequency of $f_1$ or $f_0$. If a "1" were received, the difference frequency would be $f_1$; if a "0" were received, it would be $f_0$. Likewise, received signals delayed more or less relative to the locally generated frequency-sweep signal would give rise to difference frequencies in bands about $f_1$ and $f_0$.

Signals with frequencies in these bands can easily be separated from other detector products and from spurious signals by the simple expedient of narrow band filtering. Two such filters are, accordingly, connected to the output of the heterodyne detector. The filter designated 42 in FIG. 1B is designed to reject all signals outside of a band centered at $f_1$ and that designated 44 performs a similar function at $f_0$. Envelope detector-low-pass-filter combinations 46 and 48 are then connected to the outputs of the respective filters to transform the in-band constant frequency signal into direct-current voltage signals. Slicers 50 and 52 are then used to provide regenerated data corresponding to "1's" and "0's" respectively. The two final outputs can then be suitably combined to restore the serial data wave train originally supplied by the data source.

It should be noted that the extent of sweep, $\Delta f$, introduced in the transmitted signal need not be excessively large to obtain substantial benefits. In fact, it has been determined experimentally that in many typical multipath channels the attenuation is approximately a periodic peak-and-valley function of frequency. To substantially increase the effective received power relative to signals at fading frequencies it is only necessary to have the frequency sweep include a span of frequencies having relatively low attenuation. To ensure that these frequencies are always included despite long term drifts, the sweep range can be made approximately equal to the frequency period between successive peaks of the above mentioned attenuation function.

The advantages inherent in the present invention can be more fully appreciated by considering the greatly minimized ultimate effect of various transmission perturbations or transmitted signals. First, the elimination of various multipath disturbances is illustrated in FIG. 2.

FIG. 2A shows a first signal 54 received by some given path and a second signal 56 received by some other path and delayed with respect tot he first signal by a time equal to $t_L$. As an illustration, signals corresponding to two consecutive binary zeros are shown as having been received over each path. If no frequency sweeping had been inserted at the transmitter, these signals might well have been received by such paths as to substantially cancel each other. Now, however, the frequency sweeping has resulted in these unequally delayed signals being received at any given time at different frequencies, thereby preventing complete cancellation.

When the two signals shown in FIG. 2A are heterodyned a with the receiver frequency-sweep signal shown in FIG. 2B, a difference signal is produced for each. Since the first received signal 54 is shown to be in time synchronism with the receiver frequency-sweep signal, it gives rise to a single constant difference frequency, $f_0$, while the delayed replica 56 gives rise to a pair of frequencies. These difference signals are separated in frequency by an amount dependent upon $t_L$ as shown in FIG. 2C.

The solid line 58 in FIG. 2C represents the difference signal corresponding to the first received signal and the dashed lines 60 correspond to the second received signal. Thus, a potentially deleterious time lag corresponding to unequal path lengths is transformed into an innocuous frequency translation. A similar pattern of translated frequencies results if the second received signal precedes the first received signal rather than lagging behind it. This is also true for information character sequences other than the double "0" used as an illustration. In all of these cases, the signals received by way of the various transmission paths give rise to difference frequency signals within the pass band of one of the filters 42 or 44 shown in FIG. 1B. The net effect, then, is to have all signals received by way of all paths add constructively and thus to increase the effective received power. This includes the addition of signals which, if transmitted by normal frequency shift keying means, would have largely cancelled each other. Since cancellation is a principal source of slow selective fading, a significant reduction of this phenomenon is tantamount to enhanced fading performance and a consequent improvement in data error rate.

Since the transmitted signals are at a continuously varying frequency, those received can be at frequencies subject to fading for only a very small portion of a signal element. Of course it would be preferable to transmit signals at a single frequency experiencing minimum attenuation. Because information regarding this exact frequency is seldom available, and because it would not be the same at all times, nor for all stations at the same time, the technique described here does the next best thing. That is, this invention provides an increase in the average amount of power received; the output signals are not quite so powerful as would be the case for signals at the minimum attenuation frequency, but they are much more so than signals sent at a fading frequency.

A second major benefit that accrues from the use of the present invention relates to the single frequency, or narrow-band, characteristics of the medium. Because the desired signal comprises a band of frequencies, high attenuation of a single frequency, or a narrow-band of frequencies, will give rise to a poor response over only a small portion of a received signal element. By suitable adjustment of time constants in the low-pass filters, such irregularities can be easily and substantially reduced. Likewise, when interference due to a high-level extraneous narrow-band signal is encountered, the present invention can be used to substantially eliminate its effect. Such a high level signal would, after being heterodyned, result in a swept signal having but short duration in the band of the desired signal's difference frequency. Once again an appropriate choice of time constant in the low-pass filter can substantially eliminate the resulting anomaly.

It should be noted that the above advantages are achieved without an attendant increase in transmitted power. Thus, an effective increase in the signal-to-noise ratio is achieved, not by increasing the desired signal power, but rather by minimizing the effects of troublesome signals.

It should be understood that the present invention is not limited to the embodiment shown in FIGS. 1A and 1B described above. Although that embodiment illustrates many advantages of the invention, it by no means exhausts its possible areas of application nor its numerous virtues. Several aspects of the present invention not explicitly set forth above will now be discussed.

Because the present invention includes means for translating phase differences in signalling elements into easily recognizable frequency differences, it is particularly suitable for monitoring the state of synchronization between receiving and transmitting terminals. This may be considered quite apart from any multipath advantage. In fact, the ability to extract synchronization information from a frequency-swept signal can be used to advantage on a non-multipath channel.

Referring again to FIG. 1B, it is clear that any lack of synchronism would be reflected in a shift in filtered signal energy content away from the nominal center frequency of the difference signal corresponding to both "1's" and "0's." Therefore, the output of the narrow band filter corresponding to a "0," can be applied to a frequency discriminator 45 which provides a voltage proportional to frequency. The discriminator output can then be used as a bias source to control the timing of pulses from the receiver sweep sync circuit 30. When these pulses occur at such time as to reduce the discriminator output to some reference level, it is certain that synchronism has been restored.

It is often useful to have a single parameter which is representative of the over-all status of a communication channel. Such an indication is often implicit in such widely-used terms as channel attenuation or signal-to-noise ratio. In many cases, though, only a small part of a communication channel is sampled as regards its attenuation, for example, and the results then extrapolated to cover the entire channel. An example of such a measurement might be the attenuation at 1000 c.p.s. in a telephone channel. In all but the most deterministic channels such a measurement would have to be repeated at several points in the frequency band at many different points in time, and the results averaged in some manner, to be truly representative.

In particular, multipath channels with their attendant selective fading defy accurate characterization by one, or even a few, measurements. The present invention provides simplified means for providing a meaningful indication of the state of an entire channel. In general, the various inputs to a receiver are, according to the present invention, distributed over a range of frequencies and phases. The combined instantaneous result, if the effect of the limiter 38 in FIG. 1 is removed, is a voltage at the output of the envelope-detector-low-pass-filter combinations 46 and 48 which is proportional to the vector sum of all components in the range. The extent of the frequency range present at any time is proportional to the spread of delays. As a multipath channel deteriorates further, that is, as the spread of delays increases, the components that enter into the vector sum are spread into a wider band. As the number of paths having a unique delay increases so does the number of individual frequency components. Accordingly, the very properties that would otherwise deteriorate communications are turned to advantage in specifying more eloquently a composite representation of the instantaneous attenuation of a channel. Further, if the vector sum signal itself is averaged over a signal element duration, or some large part thereof, by any standard averaging technique, a still more representative voltage level is obtained. It should be understood that the time constants in the envelope-detector-low-pass-filter combination may be chosen to allow any desired degree of smoothing of this characterizing voltage.

The demodulation means shown in FIG. 1B is meant to be merely typical. In some situations it may be more desirable to use other standard means for transforming the heterodyned signal into the desired binary direct-current voltage levels. Likewise, certain of the preliminary transmitter and receiver operations may be combined or eliminated for purposes of particular applications.

Although the frequency-sweep signals generated at both the transmitter and receiver have heretofore been restricted to be linearly increasing in frequency, no such limitation is inherent in the present invention. A linearly increasing sweep for the first half of a signaling element followed by a decreasing sweep with equal magnitude (but opposite sense) slope for the other half may be superior for some applications. In addition, other non-linear sweeps, such as logarithmic, may also be used to advantage in some applications.

When a number of digital communication channels are frequency multiplexed in adjacent frequency slots, an economy can be achieved by using the same receiver frequency-sweep generator, i.e., voltage-controlled oscillator. All that is required is a large bank of narrow band filters each with a pass band centered at a different frequency to separate the increased number of information-bearing difference frequencies.

In some cases it will prove helpful to vary the nature of the frequency sweep in adjacent channels of a frequency multiplex system to minimize cross talk. Another modification that can be made at the cost of some complexity is an alternation of the slope of the frequency sweep. If, for example, successive signal elements were swept at different rates but for equal durations, it would be possible to give a more certain indication of synchronism. That is, it would be a simple matter to detect a condition wherein the transmitter and receiver were out of step by an entire signaling element.

Numerous and varied other arrangements within the spirit and scope of the principles of the invention can, obviously, be readily devised by those skilled in the art. No attempt has been made here to exhaustively illustrate all such arrangements.

What is claimed is:

1. A digital communication system having improved means for acquiring and maintaining synchronization between terminals comprising:

a source of digital signals having N discrete levels where N is an integer greater than 1, modulating means for producing a frequency modulated signal which may be swept identically and continuously over any one of N equal width ranges of frequencies, each of said ranges containing a nominal frequency corresponding to one of the N possible levels, means for transmitting said frequency modulated signals, means for receiving said frequency modulated signals, local generating means for producing at the receiving terminal a signal swept in the same manner as the received signals, means for heterodyning said locally generated signal with said received signals to produce a difference signal with constant frequency in the neighborhood of one of the N nominal frequencies during at least part of a received signal element, means for evaluating the discrepancy between said difference signal and one of said nominal frequencies, and control means responsive to said discrepancy for adjusting the time of commencement of a period of said locally generated sweep signal, said locally generated sweep signal thereby tending to commence at such time as to decrease said discrepancy.

2. A system as in claim 1 wherein:

said modulating means comprises means for linearly varying the frequency, $f_m$, of said frequency modulated signal according to $f_m=f_i+\Delta Ft/T$, where $f_i$ is the nominal frequency associated with the $i$th element of the alphabet of said N discrete level digital signals, $\Delta f$ is the width of the range over which said frequency modulated signals are spread, T is the duration of a digital signal element, and $t$ is time measured from the beginning of a signal element, said local generating means comprises means for generating a signal with frequency, $f_1$, given by $$f_1=\Delta ft/T$$

and said evaluating means comprises a frequency discriminator.

References Cited

UNITED STATES PATENTS

| | | | |
|---|---|---|---|
| 2,392,693 | 1/1946 | Purington | 325—320 X |
| 2,422,664 | 6/1947 | Feldman | 325—65 |
| 2,715,677 | 8/1955 | Turner | 178—66 X |
| 2,839,604 | 6/1958 | Shank | 325—30 X |
| 3,020,399 | 2/1962 | Hollis | 325—30 |
| 3,117,305 | 1/1964 | Goldberg | 325—30 X |

ROBERT L. GRIFFIN, Primary Examiner

WILLIAM S. FROMMER, Assistant Examiner

U.S. Cl. X.R.

178—66, 69.5; 325—61, 65